(12) United States Patent
Chen (10) Patent No.: US 10,355,523 B2
(45) Date of Patent: Jul. 16, 2019

(54) POWER DISTRIBUTION TERMINAL CAPABLE OF DETERMINING FAULT TYPE AND DETERMINATION METHOD THEREOF

(71) Applicants: Siemens Aktiengesellschaft, Munich (DE); Ji Chen, Nanjing (CN)

(72) Inventor: Ji Chen, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 176 days.

(21) Appl. No.: 15/320,455

(22) PCT Filed: Aug. 1, 2014

(86) PCT No.: PCT/CN2014/083595
§ 371 (c)(1),
(2) Date: Dec. 20, 2016

(87) PCT Pub. No.: WO2016/015348
PCT Pub. Date: Feb. 4, 2016

(65) Prior Publication Data
US 2017/0256985 A1    Sep. 7, 2017

(51) Int. Cl.
*H02J 7/30*    (2006.01)
*H02J 13/00*    (2006.01)
(Continued)

(52) U.S. Cl.
CPC ............ *H02J 13/002* (2013.01); *G05B 15/02* (2013.01); *H02H 3/07* (2013.01); *H02H 7/30* (2013.01); *H02J 3/14* (2013.01); *H02J 2003/001* (2013.01)

(58) Field of Classification Search
None
See application file for complete search history.

(56) References Cited

U.S. PATENT DOCUMENTS 5,237,511 A  *  8/1993  Caird ..................... H02H 7/261
                                                      700/293
5,773,980 A  *  6/1998  Yang ..................... G01R 31/088
                                                      324/522
(Continued)

FOREIGN PATENT DOCUMENTS

CN    1375900 A    10/2002
CN    1536737 A    10/2004
(Continued)

OTHER PUBLICATIONS

International Search Report and Written Opinion dated Dec. 29, 2014.
(Continued)

*Primary Examiner* — Michael Lebentritt
(74) *Attorney, Agent, or Firm* — Harness, Dickey & Pierce, P.L.C.

(57) ABSTRACT

A fault type determination method and device of a terminal unit for automation used in a power distribution network are disclosed. The method includes: for each line of incoming lines and outgoing lines of a distribution device, recording the number of faults occurring on the line; after a fault occurs, determining, according to the current and/or voltage on each line, whether automated reclosing is executed, and recording the number of executed automated reclosings; in a fault type determination period, for each line, if the number of faults occurring on the line is greater than the maximum number of automated reclosings allowed by the transformer substation side, or the fault is a repeat fault, then identifying the fault on the line as a permanent fault.

19 Claims, 6 Drawing Sheets

(51) Int. Cl.
*G05B 15/02* (2006.01)
*H02J 3/14* (2006.01)
*H02H 3/07* (2006.01)
*H02H 7/30* (2006.01)
*H02J 3/00* (2006.01)

(56) References Cited

U.S. PATENT DOCUMENTS

| | | | |
|---|---|---|---|
| 6,778,370 B1 | 8/2004 | Laplace et al. | |
| 6,894,478 B1 * | 5/2005 | Fenske | H02H 3/006 |
| | | | 324/117 R |
| 7,110,231 B1 | 9/2006 | De La Ree et al. | |
| 7,154,722 B1 | 12/2006 | Stoupis et al. | |
| 2002/0133304 A1 | 9/2002 | McClure et al. | |
| 2004/0233598 A1 * | 11/2004 | Yamada | H02H 7/261 |
| | | | 361/62 |
| 2009/0112375 A1 | 4/2009 | Popescu | |
| 2012/0155557 A1 | 6/2012 | Bush | |
| 2013/0003238 A1 | 1/2013 | Bush | |
| 2014/0207300 A1 * | 7/2014 | Yun | H02H 1/0092 |
| | | | 700/292 |
| 2014/0277804 A1 * | 9/2014 | Witte | H02H 3/093 |
| | | | 700/293 |
| 2016/0077149 A1 * | 3/2016 | Schweitzer, III | G01R 31/2836 |
| | | | 307/131 |
| 2016/0216310 A1 * | 7/2016 | Schweitzer, III | G01R 31/088 |
| 2017/0110872 A1 * | 4/2017 | Saarinen | H02H 3/06 |
| 2017/0256985 A1 * | 9/2017 | Chen | G05B 15/02 |
| 2018/0083437 A1 * | 3/2018 | Schweitzer, III | H02H 3/083 |

FOREIGN PATENT DOCUMENTS

| | | |
|---|---|---|
| CN | 101425672 A | 5/2009 |
| CN | 103354352 A | 10/2013 |
| JP | 2001283706 A | 10/2001 |

OTHER PUBLICATIONS

Chinese Office Action dated Jun. 1, 2018.
Extended European Search Report dated Apr. 4, 2018.
Office Action for Chinese Patent Application No. 201480078486.9 dated Dec. 25, 2018.

* cited by examiner

POWER DISTRIBUTION TERMINAL CAPABLE OF DETERMINING FAULT TYPE AND DETERMINATION METHOD THEREOF

PRIORITY STATEMENT

This application is the national phase under 35 U.S.C. § 371 of PCT International Application No. PCT/CN2014/083595 which has an International filing date of Aug. 1, 2014, which designated the United States of America, the entire contents of which are hereby incorporated herein by reference.

FIELD

Embodiments of the present invention generally relates to a power distribution system, in particular to an automation terminal capable of detecting fault type in a power distribution system, and/or a method for determining fault type at the automation terminal.

BACKGROUND

An electric power system generally comprises the stages of power generation, transmission, distribution and use. Amongst these stages, an electric power network which receives electrical energy from a power transmission grid (or from a local power station), and supplies and distributes electrical energy to users of various types either locally or step by step, is called a power distribution network. A power distribution network generally consists of many types of power distribution equipment and power distribution facilities, and is used for transforming voltages and distributing electrical energy directly to users. Thus, a power distribution network is characterized by a large number of nodes, broad coverage and a complex topological structure.

Figure 1:
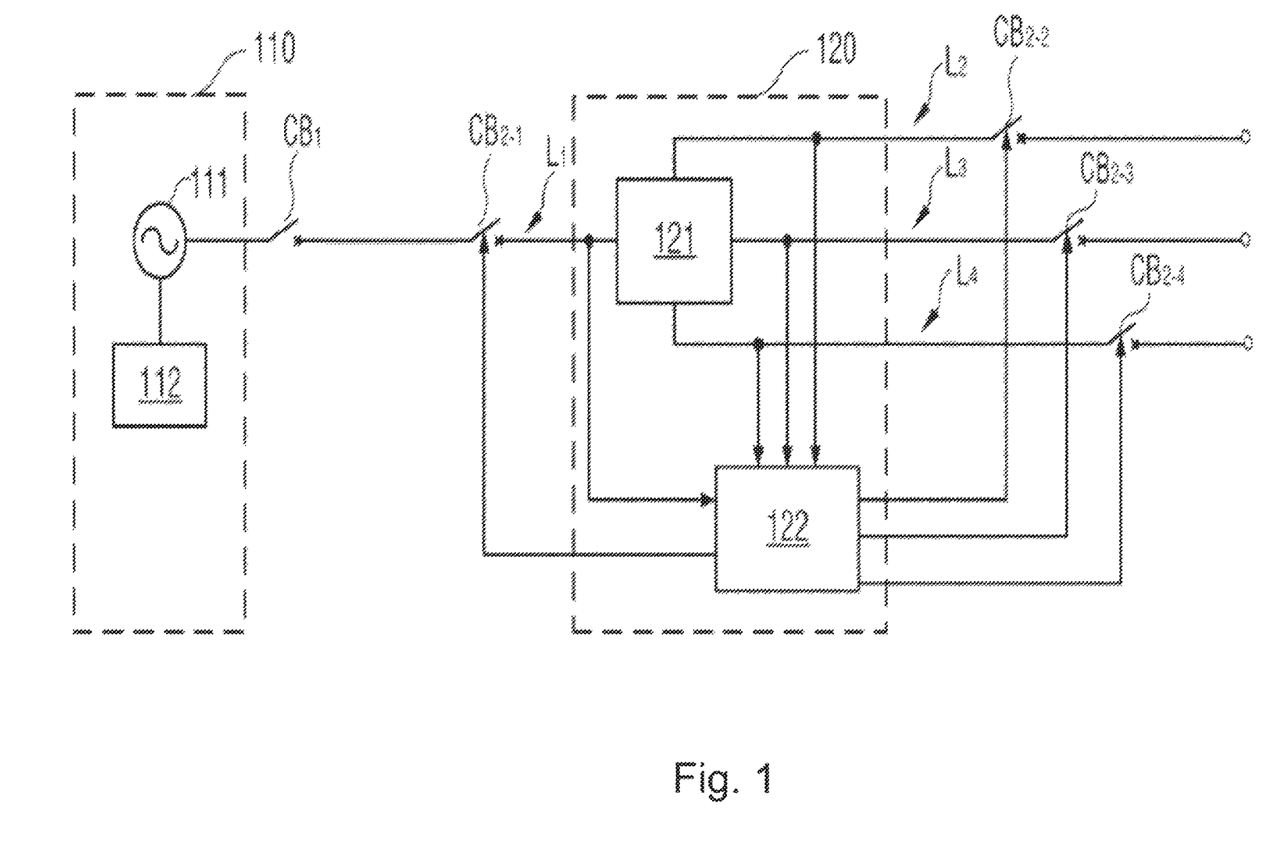
FIG. 1 shows an example of a power distribution network.

FIG. 1 shows by way of demonstration a simple example of a power distribution network. As FIG. 1 shows, a power distribution network comprises for example a substation 110 and a power distribution apparatus 120. The substation 110 converts high voltages on a power transmission line to voltages suitable for distribution by the power distribution network (e.g. 35 KV, KV or 220 V). The electrical energy output by the substation 110 is delivered to a power distribution apparatus 120 via a power distribution line. The power distribution apparatus 120 may for example be a distribution station or a distribution switching station, and may also be a pole-mounted switch or switchgear, or another power distribution apparatus or power distribution facility. As FIG. 1 shows, the power distribution apparatus 120 has at least one incoming line L1, and one or more outgoing line (or feeder) L2-L4 (only 3 outgoing lines are shown in the figure by way of demonstration). The incoming line L1 is connected to, for example, an output of the substation 110. The outgoing lines L2-L4 may for example be connected to user terminals of various types, to distribution electrical power to users. A switch 121 in the power distribution apparatus 120 is for example used for switching the connection relationship between the incoming line and the outgoing lines.

In FIG. 1, the substation 110 and power distribution apparatus 120 are also equipped with equipment for achieving automation of power distribution or automatic protection, for example a substation protection (SP) apparatus 112 located at the substation 110 and an automation terminal (AU: terminal unit for automation) 122 located at the power distribution apparatus 120. As FIG. 1 shows, a circuit breaker CB1 for example is also disposed at an outlet of the substation 110, and may be called a substation outlet circuit breaker. The SP 112 monitors the operating situation of a transformer 111 in the substation 110, and the line situation. In the event of a fault, the SP 112 causes the circuit breaker CB1 to open, or causes the circuit breaker CB1 to realize automated reclosing (AR) as required. Here, the transformer 111 for example converts a high-voltage power transmission voltage, or electrical energy generated by a local power station, to a power distribution voltage, and can be regarded as a source end for electrical energy with respect to a user end.

Similarly, on the side of the power distribution apparatus 120, the switch 121 is connected to the incoming line and outgoing lines, to establish or break the electrical connection between the incoming line and one or more outgoing lines. The switch 121 is for example a pole-mounted switch. Circuit breakers CB2-1-CB2-4 are disposed on the incoming line and outgoing lines L1-L4 respectively.

The AU 122 monitors the state of the incoming line and outgoing lines L1-L4, and in the event of a fault, opens the circuit breaker on the corresponding line. In actual applications, the AU may for example be a power distribution terminal (DTU: distribution terminal unit) mounted on a distribution switching station, and may also be a feeder terminal (FTU: feeder terminal unit) for a pole-mounted switch. The SP 112 and AU 122 in FIG. 1 may also be connected to a power distribution sub-station, or a power distribution main station, via a communication network, to report the operating state of the substation and the power distribution apparatus.

In the network shown in FIG. 1, if a fault occurs on any one of the incoming line or outgoing lines of the power distribution apparatus, the SP 112 will detect the fault on the load line thereof, and thereby cause CB1 to trip. If the substation 110 is provided with an automated reclosing function, the SP 112 can control the CB1 to close automatically after a predetermined waiting time (automated reclosing interval). According to user requirements, the SP 112 can execute automated reclosing multiple times. The maximum number of automated reclosing operations (Nrm: Maximum Number of AR) can be set by a user according to actual requirements, or a system default value may be used.

Due to the provision of automated reclosing, on the power distribution apparatus side it is very difficult to determine quickly and accurately which line has a fault, and whether the fault is a permanent fault which needs to be isolated or a transient fault which can return to normal automatically. This is because the line fault detected on the power distribution apparatus side might for example be an actual outgoing line fault, or a false fault caused by compound fluctuation or interference, or a transient fault existing only for a short time. For this reason, a method and apparatus capable of automatically determining the fault type on the power distribution apparatus side is still needed in the prior art.

SUMMARY

The embodiments of the present invention propose a method and apparatus capable of determining fault type on a power distribution apparatus side, so as make the elimination and prompt isolation of the fault convenient.

An automation terminal for a power distribution network according to an embodiment of the present invention, disposed at a power distribution apparatus, and used to monitor at least one incoming line and at least one outgoing line of the power distribution apparatus, the automation terminal comprising: a fault detection apparatus, which for each line amongst the incoming line(s) and the outgoing line(s), records the number of faults which occur on the line; an automated reclosing detection apparatus, which determines the number of automated reclosing operations executed by a substation side associated with the power distribution apparatus on the basis of a current and/or voltage on each line; a fault determination apparatus, which determines, for each line and within a fault type determination period, that a fault on the line is a permanent fault, if the number of faults which occur on the line is greater than a maximum number of automated reclosing operations permitted by the substation side, or if the fault is a further fault; wherein the fault type determination period is a predetermined time period after the $j^{th}$ automated reclosing operation, where j is a natural number, j is greater than or equal to 1, and less than or equal to the maximum number of automated reclosing operations.

A fault type determination method for an automation terminal in a power distribution network according to another embodiment of the present invention, the method comprising: for each line amongst the incoming line(s) and the outgoing line(s), recording the number of faults which occur on the line; on the basis of a current and/or voltage on each line, determining the number of automated reclosing operations executed on the line; determining, for each line and within a fault type determination period, that a fault on the line is a permanent fault, if the number of faults which occur on the line is greater than a maximum permitted number of automated reclosing operations, or if a further fault has occurred on the line; wherein the fault type determination period is a predetermined time period after the $j^{th}$ automated reclosing operation, where j is a natural number, j is greater than or equal to 1, and less than or equal to the maximum number of automated reclosing operations.

A power distribution system according to another embodiment of the present invention, comprising: a substation, which delivers electrical energy to a line at a power distribution voltage; a power distribution apparatus, for distributing electrical energy from the substation, the power distribution apparatus comprising at least one incoming line and at least one outgoing line; an automation terminal as described above, which detects the condition of each line amongst the incoming line(s) and the outgoing line(s), and determines whether a fault which occurs on a line is a permanent fault on the basis of a maximum number of automated reclosing operations at the substation.

An automation terminal according to another embodiment of the present invention, disposed at a power distribution apparatus, and used to monitor at least one incoming line and at least one outgoing line of the power distribution apparatus, the automation terminal comprising: a memory, storing a machine-executable code which, when run by a processor, can execute the method described above; and a processor coupled to the memory, for executing the machine-executable code stored on the memory.

An embodiment of the present invention also provides a machine-readable medium, on which are stored executable commands which when executed cause a machine to execute operations included in at least one embodiment of the method described above.

BRIEF DESCRIPTION OF THE DRAWINGS

Other features, characteristics, advantages and benefits of the present invention will be made more obvious by the following detailed description which makes reference to the accompanying drawings.

FIGS. 3A-C show waveform graphs of signals at the AU, in the case where the maximum number of automated reclosing operations at the substation is 2.

DETAILED DESCRIPTION OF EXAMPLE EMBODIMENTS

An automation terminal for a power distribution network according to an embodiment of the present invention, disposed at a power distribution apparatus, and used to monitor at least one incoming line and at least one outgoing line of the power distribution apparatus, the automation terminal comprising: a fault detection apparatus, which for each line amongst the incoming line(s) and the outgoing line(s), records the number of faults which occur on the line; an automated reclosing detection apparatus, which determines the number of automated reclosing operations executed by a substation side associated with the power distribution apparatus on the basis of a current and/or voltage on each line; a fault determination apparatus, which determines, for each line and within a fault type determination period, that a fault on the line is a permanent fault, if the number of faults which occur on the line is greater than a maximum number of automated reclosing operations permitted by the substation side, or if the fault is a further fault; wherein the fault type determination period is a predetermined time period after the $j^{th}$ automated reclosing operation, where j is a natural number, j is greater than or equal to 1, and less than or equal to the maximum number of automated reclosing operations.

Preferably, when the automation terminal has a fault isolation function, the fault type determination period is a predetermined time period after the $j^{th}$ automated reclosing operation, where j is the maximum number of automated reclosing operations. Optionally, when the automation terminal lacks a fault isolation function, the fault type determination period is a predetermined time period after the $j^{th}$ automated reclosing operation, where j is one less than the maximum number of automated reclosing operations. Optionally, when the maximum number of automated reclosing operations is 1, the fault type determination period is a predetermined time period after the $j^{th}$ automated reclosing operation, where j=1. When the maximum number of automated reclosing operations is 0, the fault type determination period is a predetermined time period after the $j^{th}$ automated reclosing operation, where j=0.

Preferably, when the automated reclosing detection apparatus detects that a line has lost power and then been energized, it is determined that an automated reclosing operation has been executed. Preferably, the automation terminal is a power distribution terminal or a feeder terminal.

A fault type determination method for an automation terminal in a power distribution network according to another embodiment of the present invention, the method comprising: for each line amongst the incoming line(s) and the outgoing line(s), recording the number of faults which occur on the line; on the basis of a current and/or voltage on each line, determining the number of automated reclosing operations executed on the line; determining, for each line and within a fault type determination period, that a fault on the line is a permanent fault, if the number of faults which occur on the line is greater than a maximum permitted number of automated reclosing operations, or if a further fault has occurred on the line; wherein the fault type determination period is a predetermined time period after the $j^{th}$ automated reclosing operation, where j is a natural number, j is greater than or equal to 1, and less than or equal to the maximum number of automated reclosing operations.

A power distribution system according to another embodiment of the present invention, comprising: a substation, which delivers electrical energy to a line at a power distribution voltage; a power distribution apparatus, for distributing electrical energy from the substation, the power distribution apparatus comprising at least one incoming line and at least one outgoing line; an automation terminal as described above, which detects the condition of each line amongst the incoming line(s) and the outgoing line(s), and determines whether a fault which occurs on a line is a permanent fault on the basis of a maximum number of automated reclosing operations at the substation.

An automation terminal according to another embodiment of the present invention, disposed at a power distribution apparatus, and used to monitor at least one incoming line and at least one outgoing line of the power distribution apparatus, the automation terminal comprising: a memory, storing a machine-executable code which, when run by a processor, can execute the method described above; and a processor coupled to the memory, for executing the machine-executable code stored on the memory.

An embodiment of the present invention also provides a machine-readable medium, on which are stored executable commands which when executed cause a machine to execute operations included in at least one embodiment of the method described above.

It can be seen from the description above that the solution of the embodiments of the present invention can realize fault type determination on an automation terminal side, and can thereby accurately isolate a permanent fault. This function makes the management of a power distribution system simpler, especially for the party which manages power distribution. Moreover, the fault type determination method proposed in an embodiment of the present invention is simple, convenient and easy to implement, and is capable of identifying fault type quickly, with no need for an excessively long delay, so that the party which manages power distribution can make the relevant determination promptly. Furthermore, the method and apparatus proposed in at least one embodiment of the present invention can accurately determine the fault type of faults occurring on different lines and in different automated reclosing periods. Thus, the method and apparatus proposed in embodiments of the present invention can be adapted to complex application scenarios.

The inventors of the present application have found through experiments and analysis that regardless of whether the substation 110 has an automatic reclosing function, the AU 122 can determine locally whether a detected line fault is a permanent fault or a transient fault. Specifically, the AU 122 can learn in advance the maximum number of automated reclosing operations Nrm on the side of the substation 110.

Then, the AU can determine, based on the number of automated reclosing operations already executed (Nr) as detected on the power distribution side as well as the number of faults $N_{fi}$ on each line, whether the line fault currently detected is a permanent fault, within a predetermined fault type determination period (Nrj). The fault type determination method proposed in an embodiment of the present invention is elaborated below in conjunction with the demonstrative power distribution network shown in FIG. 1.

Figure 2:
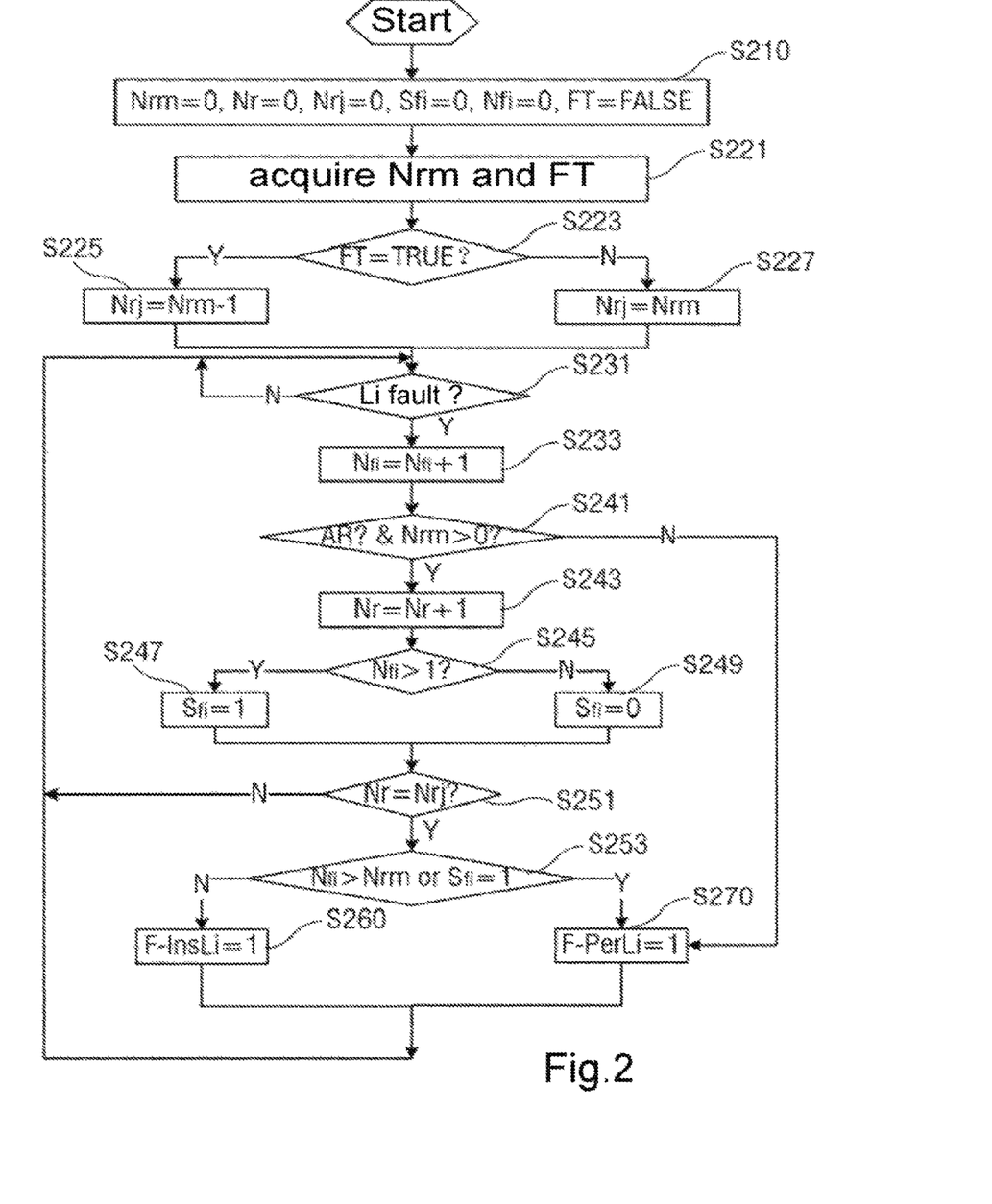
FIG. 2 shows a flow chart of a fault type determination method according to an embodiment of the present invention.

FIG. 2 shows a flow chart of a fault type determination method according to an embodiment of the present invention. The method is executed in the AU 122 shown in FIG. 1 for example. As FIG. 2 shows, the fault type determination method preferably begins with step S210. In step S210, the AU 122 performs initialization, including but not limited to initialization of the following parameters:

The maximum number of automated reclosing operations on the substation side Nrm=0.

The number of automated reclosing operations executed on the substation side, as measured on the AU side, Nr=0.

The fault type determination period Nrj, i.e. fault type determination performed after the $Nrj^{th}$ automated reclosing operation, Nrj=0.

The number of faults for each line amongst the incoming line L1 and the outgoing lines L2-L4, $N_{fi}$=0, where i=1 to 4.

For each line Li, i=1, 2, 3 or 4, the further fault indicator $S_{fi}$=0.

The indicator of whether the AU has a fault isolation function, FT=FALSE (no fault isolation function by default).

Once initialization is complete, in step S221, the AU acquires the maximum number of automated reclosing operations on the substation side Nrm and the indicator FT of whether the AU has a fault isolation function. For example, Nrm may be a parameter inputted manually by a user. Nrm may also be a default value stored in the AU, or a value obtained from a power distribution main station via a communication network.

As for FT, if the AU is designed to have a fault isolation function, then FT=TRUE, otherwise FT=FALSE. The value of FT may likewise be inputted manually by a user or be an internal default value. The simplest scenario is that Nrm and FT are both internal default values of the AU, for example, in the example of FIG. 2, assume that Nrm=2, FT=FALSE.

Next, in step S223, it is determined whether the AU has a fault isolation function, i.e. whether FT is TRUE. If FT=TRUE, this indicates that the AU has a fault isolation function and the flow proceeds to step S225. In step S225, preferably, the fault type determination period Nrj is set to be Nrj=Nrm−1. This choice is made primarily in consideration of the fact that the AU is required to isolate a permanent fault at least before the final automated reclosing operation of the substation. Such a setting can avoid erroneous judgements caused by transient changes in current or voltage. If FT=FALSE, this indicates that the AU lacks a fault isolation function and the flow proceeds to step S227. In step S227, Nrj=Nrm, in other words, if the AU has no fault isolation function, fault type determination can be performed at the latest after all the automated reclosing operations of the substation side have ended. Here, the choice of fault type determination period Nrj is not limited to the cases shown in FIG. 2. The choice of Nrj=Nrm−2 (if Nrm>3) or another feasible value may be made according to actual circumstances.

Next, in step S231, the AU determines whether a fault has occurred on the incoming line and outgoing lines Li. If it is determined in step S231 that a fault has occurred (e.g. an overcurrent or overvoltage fault), the flow proceeds to step S233. In step S233, one is added to the number of faults, i.e. $N_{fi}=N_{fi}+1$. If there is no fault, then the flow repeats the fault determination of step S231.

In step S241, the AU begins automatic reclosing determination. The AU can determine, based on whether a loss of power (zero current and/or voltage) followed by energization (non-zero current and/or voltage) occurs on the incoming line Li thereof, whether automated reclosing has been executed at the substation. Preferably, it can be determined that automated reclosing has been executed when all the lines have lost power and subsequently any line has been energized. If Nrm is equal to 0 (no automated reclosing function), the flow enters step S270; after waiting for a predetermined time, it is confirmed that a permanent fault has occurred, and a permanent fault indicator F-Per$_{fi}$=1 is output. If the AU determines that the substation has an automated reclosing function (Nrm>0) and automated reclosing has been executed on the substation side, the number of automated reclosing operations Nr is increased by 1 in step S243, and step S245 is entered. Optionally, step S241 may be replaced by first determining whether Nrm is greater than zero, and then determining whether automatic reclosing has been executed.

In step S245, the AU further determines whether the fault on the line is a further fault, i.e. determines whether the number of line faults $N_{fi}$ satisfies $N_{fi}>1$. If this is satisfied, then step S247 is entered so that the further fault indicator $S_{fi}=1$, otherwise step S249 is entered, keeping $S_{fi}=0$. Then the flow proceeds to step S251.

In step S251, the AU must begin to determine whether the fault type determination period has been reached at the present time, i.e. to determine whether Nr is equal to Nrj. If Nr=Nrj, the AU initiates a fault type determination process, i.e. enters step S253. Otherwise, the flow returns to step S231, and continues to monitor whether a fault has occurred on each line. In step S253, if Nfi>Nrm or Sfi=1, then it is determined that the fault on the corresponding line is a permanent fault, and the flow proceeds to step S270 in which a permanent fault indicator F-Per$_{Li}$=1 is output. Otherwise, step S260 is entered, and a transient fault indicator F-Ins$_{Li}$=1 is output. Once fault type determination is complete, the flow returns to step S231 and monitoring is continued to determine whether a fault has occurred on each line. If there is a fault isolation function at the AU, then a fault isolation step (not shown in the figure) is executed after completion of step S270 shown in FIG. 2, e.g. a corresponding circuit breaker is instructed to open.

In the demonstrative fault determination flow shown in FIG. 2, the fault type determination part may also be realized using another logic sequence. For example, steps S251 and S253 in FIG. 2 may be replaced by, for instance, the AU determining whether Nfi satisfies Nfi>Nrm. If this is satisfied, then it is determined that the line fault at the present time is a permanent fault, i.e. the flow proceeds to step S270. Otherwise, a further determination is made regarding whether Nr and $S_{fi}$ simultaneously satisfy: Nr=Nrj and $S_{fi}=1$. If this condition is satisfied, then the flow proceeds to step S270 and a permanent fault indicator is output. If the condition that Nr=Nrj and $S_{fi}=1$ is not satisfied, then the flow proceeds to step S260 and a transient fault indicator is output. Once fault type determination is complete, the flow returns to step S231, and monitoring is continued to determine whether a fault has occurred on each line.

Optionally, the fault type determination flow shown in FIG. 2 may also be realized using multiple parallel threads. For example, steps S231, S233, S245, S247 and S249 in FIG. 2 may be executed cyclically in an independent thread, to execute further fault detection, and output $N_{fi}$ and $S_{fi}$. Steps S241 and S243 in FIG. 2 may also be executed cyclically in an independent thread to complete automated reclosing detection, and output Nr. A main program may comprise an initialization part S210-S227, and a fault type determination part (steps S251, S253, S260 and S270), i.e. determining the fault type on the basis of the parameters (Nr, $S_{fi}$ and $N_{fi}$) output by the two independent threads.

Figure 3A:
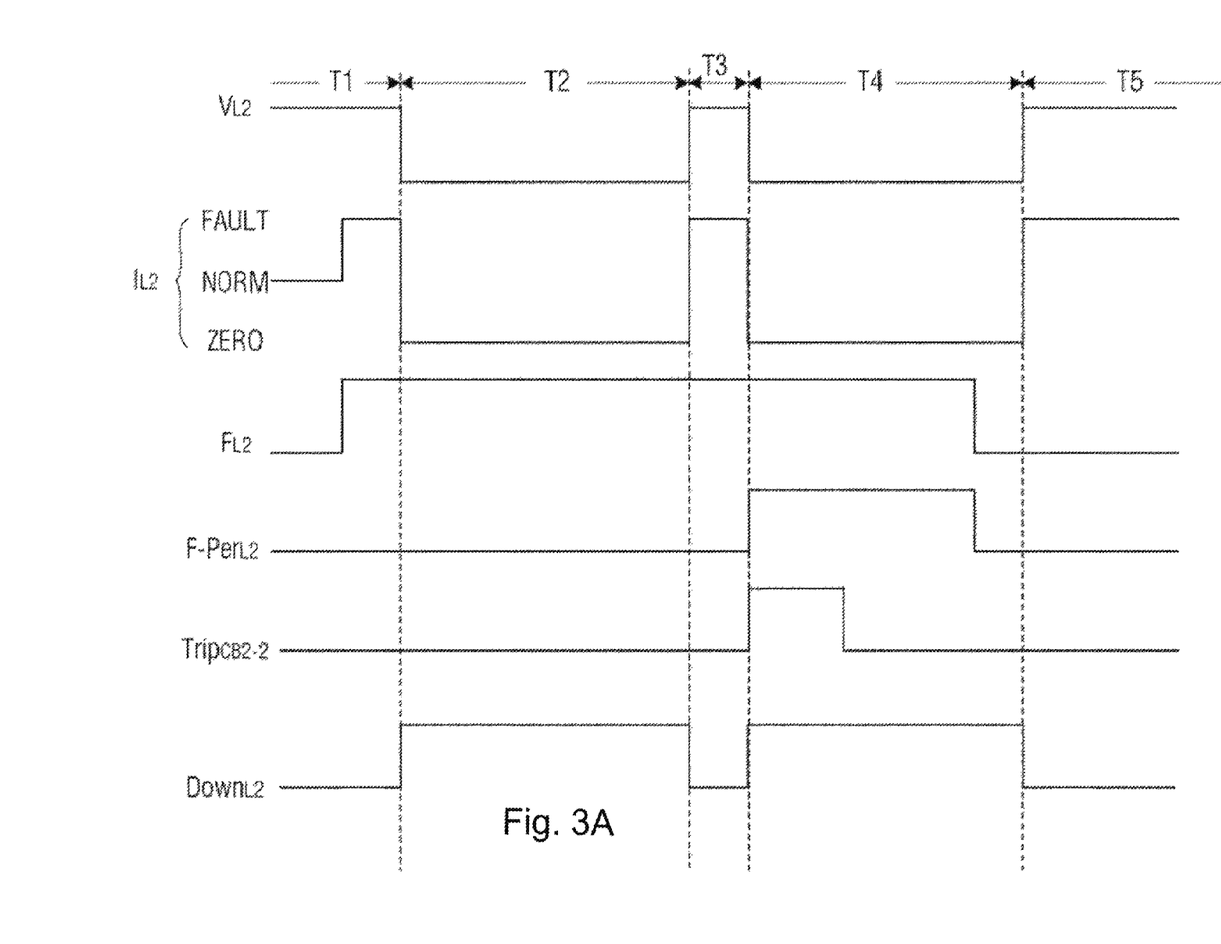
FIG. 3A is a scenario in which a permanent fault occurs at the AU and fault isolation is needed.
Figure 3B:
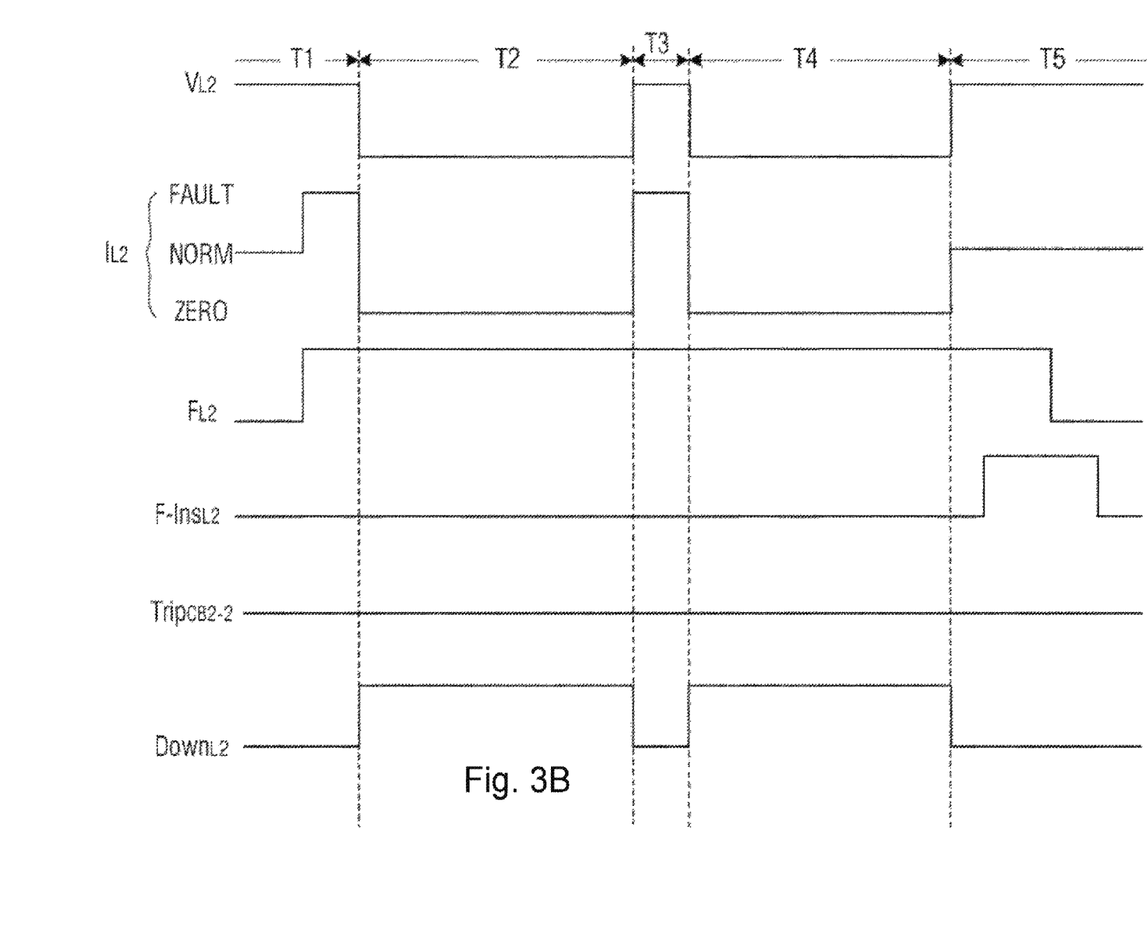
FIG. 3B is a scenario in which a transient fault occurs at the AU.
Figure 3C:
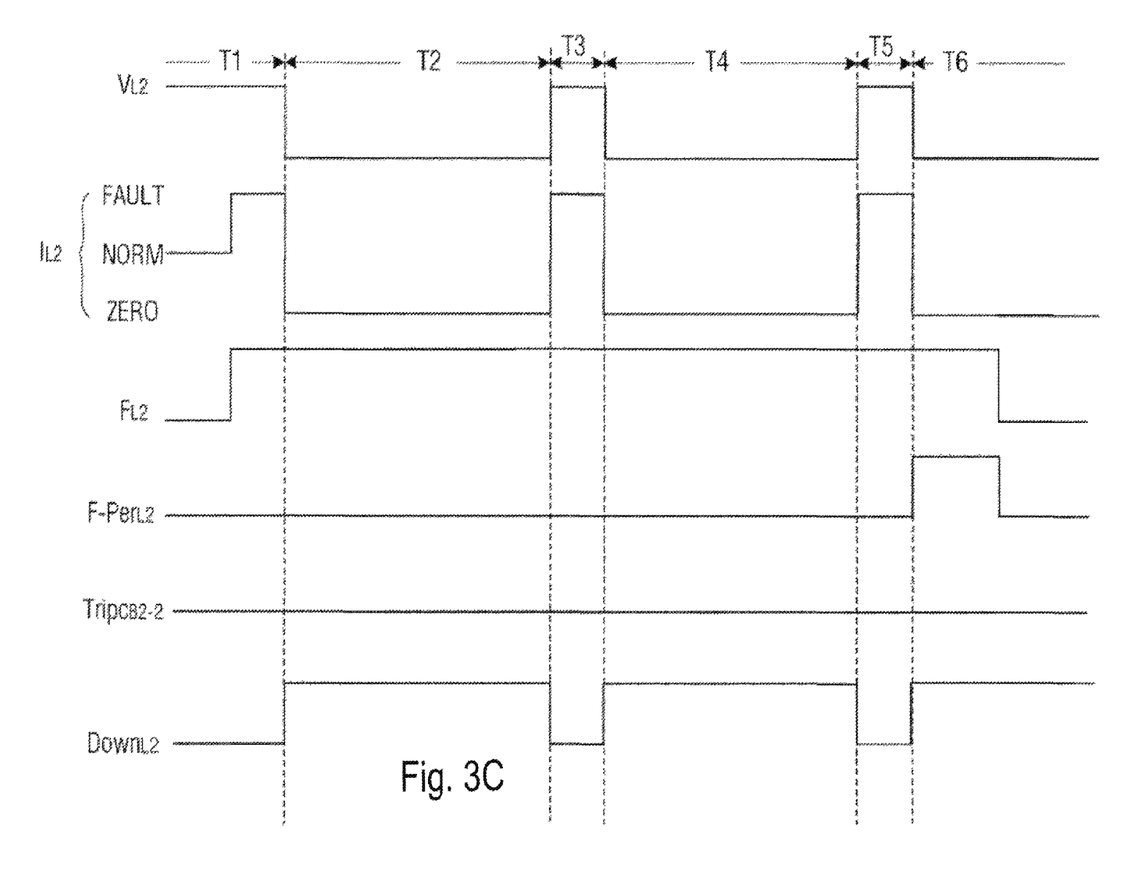
FIG. 3C is a scenario in which a permanent fault occurs at the AU and fault isolation is not needed.

FIGS. 3A-C show waveform graphs of signals during fault type determination performed by the method shown in FIG. 2, when a fault occurs on line L2, in the case where the maximum number of automated reclosing operations at the substation is 2 (Nrm=2).

FIGS. 3A-C show demonstratively the waveforms of signals which can be detected at the AU. These signals comprise the voltage $V_{L2}$ on line L2, the current $I_{L2}$ on L2, the initiation $F_{L2}$ of fault detection on L2, the permanent fault indicator F-Per$_{L2}$ on L2, the isolation trip command Trip$_{CB2-2}$ on the circuit breaker $CB_{2-2}$ on L2, and an indicator Down$_{L2}$ of loss of power on L2. The current $I_{L2}$ specifically comprises three current sizes, i.e. a fault current FAULT, a normal current NORM and a zero-current ZERO. The voltage $V_{L2}$ specifically comprises a normal voltage NORM and a zero-voltage ZERO. The other signals all have a HIGH level as a valid value "1" and a LOW level as an invalid value "0".

FIG. 3A shows demonstratively a scenario in which a permanent fault occurs at AU and fault isolation is necessary (FT=TRUE), i.e. Nrj=Nrm−1=1. As FIG. 3A shows, within the time period T1, the current $I_{L2}$ on L2 develops a fault current. Once the AU has detected the fault, fault detection is initiated, $F_{L2}=1$. At this time, a fault is discovered in step S231 in the flow of FIG. 2 for example. The SP on the substation side detects the occurrence of the fault current and therefore causes the circuit breaker CB1 to trip, the trip lasting for time T2. Within time period T2, since CB1 is tripped, the AU detects that the current and voltage on L2 are zero ($I_{L2}$=ZERO and $V_{L2}$=ZERO), and correspondingly, the power loss indicator Down$_{L2}$=1. On the substation side, the SP causes the CB1 to reclose automatically once the CB1 has been tripped continuously for the predetermined time T2, i.e. a first automated reclosing operation ($1^{st}$ AR) is executed. In the example shown in FIG. 3A, during the first reclosing operation (the time period T3), the voltage $V_{L2}$ on L2 recovers, and the current $I_{L2}$ again develops a fault current FAULT. This further fault current again causes the CB1 on the substation side to trip (T4). In the time period T4, the further tripping of the CB1 enables the AU to detect the first reclosing operation (the line has lost power and then been energized) according to the flow shown in FIG. 2 so that Nr=1, and a further fault, $N_{fi}=2$ and $S_{fi}=1$. Then, the AU determines that the fault type is a permanent fault (because Nr=Nrj=1 and $S_{fi}=1$) as shown in FIG. 2 (steps S253-S270), and the permanent fault indicator F-Per$_{L2}$ is set to valid. Since a permanent fault has been discovered, the AU then executes fault isolation, i.e. issues a trip command Trip$_{CB2-2}$ within T4, so that the circuit breaker $CB_{22}$ on line L2 trips. Since the permanent fault is isolated, when automated reclosing is executed again on the substation side ($2^{nd}$ AR, T5), the voltage and current on L2 are both normal, and CB1 on the substation side does not trip again.

FIG. 3B shows demonstratively a scenario in which a transient fault occurs at the AU and there is no need for fault isolation (FT=FALSE), i.e. Nrj=Nrm=2. As FIG. 3B shows, similarly to FIG. 3A, the current $I_{L2}$ on L2 develops a fault current within time period T1. Once the AU has detected the fault, fault detection is initiated, $F_{L2}=1$. At this time, a fault is discovered in step S231 in the flow of FIG. 2 for example. The SP on the substation side detects the occurrence of the fault current and therefore causes the circuit breaker CB1 to trip. Similarly to FIG. 3A, the AU detects the loss of power on L2, i.e. $Down_{L2}=1$. On the substation side, the SP causes the CB1 to reclose automatically once the CB1 has been tripped continuously for the predetermined time T2, i.e. a first automated reclosing operation ($1^{st}$ AR) is executed. In the example shown in FIG. 3B, after the first automated reclosing operation, a fault current again occurs on L2. The AU detects the first reclosing operation and further fault, so that Nr=1, $N_{fi}=2$ and $S_{fi}=1$. Then, in time period T4, CB1 trips again due to the fault, and a second automated reclosing operation ($2^{nd}$ AR) is executed after T4. In the example shown in FIG. 3B, after the second automated reclosing operation, the voltage and current on L2 both return to normal. Then the AU determines that the fault type is a transient fault (because Nr<Nrj) as shown in FIG. 2, and the transient fault indicator $F\text{-}Ins_{L2}$ is set to valid. Once the fault on line L2 has disappeared, the transient fault indicator is also cleared.

FIG. 3C shows demonstratively a scenario in which a permanent fault occurs at the AU and there is no need for fault isolation (FT=FALSE), i.e. Nrj=Nrm=2. As FIG. 3C shows, unlike FIG. 3A, the AU only determines the fault type after a second automated reclosing operation ($2^{nd}$ AR) (T6). Specifically, after the second automated reclosing operation, the AU detects the second reclosing operation and a further fault, so that Nr=2, $N_{fi}=3$ and $S_{fi}=1$. Then, in time period T5, CB1 trips again due to a fault. At this time, the AU determines that the fault type is a permanent fault as shown in FIG. 2 (because $N_{fi}>Nrm$), and the permanent fault indicator $F\text{-}Per_{L2}$ is set to valid. Since the substation has already completed the maximum number of automated reclosing operations, the CB1 on the substation side remains in a tripped state, awaiting manual handling.

The method proposed in an embodiment of the present invention may also be suited to a scenario in which there is no automated reclosing or in which the maximum number of automated reclosing operations is 1. In these two special scenarios, all that need be done is to set Nrj to be 1.

Figure 4:
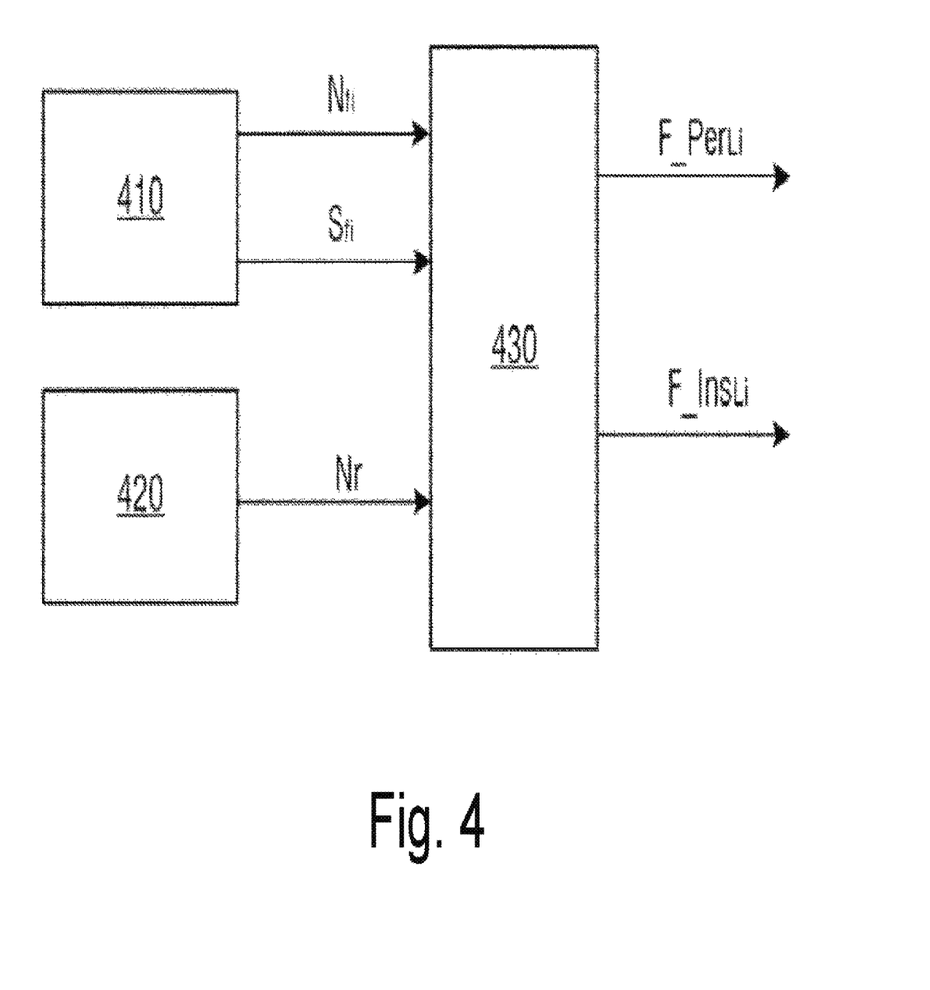
FIG. 4 shows a structural schematic diagram of an AU having a fault type determination function according to an embodiment of the present invention.

The fault type detection method proposed in an embodiment of the present invention and shown in FIG. 2 may be realized using hardware or software, or a combination of software and hardware. FIG. 4 shows demonstratively an automated apparatus (AU) in a power distribution network having a fault type determination function according to an embodiment of the present invention.

As FIG. 4 shows, the AU comprises a fault detection apparatus 410, an automated reclosing detection apparatus 420 and a fault determination apparatus 430. The fault detection apparatus 410 monitors the number of times each line Li amongst the incoming line L1 and outgoing lines L2-L4 develops a fault, and when the line Li develops a fault at least twice, marks the number of further faults occurring on the line, Sfi=1. The automated reclosing detection apparatus 420 determines, based on the current and/or voltage on each line Li, whether the substation side associated with the power distribution apparatus executes automated reclosing, and the number Nr of automated reclosing operations executed. The fault determination apparatus 430 determines, within the fault type determination period Nrj, that the fault on a line Li is a permanent fault, if the number of faults Nfi which occur on the line Li is greater than the maximum number of automated reclosing operations Nrm permitted by the substation side, or if the fault is a further fault (Sfi=1). Here, the fault type determination period may be a predetermined time period after the jth automated reclosing operation, where j is a natural number, j is greater than or equal to 1, and less than or equal to the maximum number of automated reclosing operations Nrm.

Preferably, when the AU has a fault isolation function, the fault type determination period Nrj is a predetermined time period after the $j^{th}$ automated reclosing operation, where j is the maximum number of automated reclosing operations Nrm. More preferably, when the AU lacks a fault isolation function, the fault type determination period Nrj is a predetermined time period after the $j^{th}$ automated reclosing operation, where j is one less than the maximum number of automated reclosing operations Nrm. Furthermore, when the maximum number of automated reclosing operations is 1, the fault type determination period Nrj is a predetermined time period after the $j^{th}$ automated reclosing operation, where j=1. When the maximum number of automated reclosing operations is 0, the fault type determination period Nrj is a predetermined time period after the $j^{th}$ automated reclosing operation, where j=0.

Furthermore, the automated reclosing detection apparatus 420 determines, upon detecting that the current and/or voltage on a line is zero, that the line has lost power, and determines, upon detecting that the current and/or voltage on a line is not zero, that the line is energized. Thus, when a line loses power and is then energized, the automated reclosing detection apparatus 420 determines that the substation side has executed automated reclosing.

The fault type determination method proposed in an embodiment of the present invention may also be realized as an executable code. For instance, the AU may comprise a memory, and a processor connected to the memory. Code commands may be stored in the memory; these code commands may be used to realize the method flow shown in FIG. 2. The processor may read the code commands from the memory, and execute the code commands, so as to realize the operation process shown in FIG. 2 for example. In other words, the processor may also be used to execute the operations executed by each module in FIG. 4. The embodiments of the present invention also provide a machine-readable medium, on which are stored executable commands which when executed cause a machine to realize the abovementioned functions of the processor.

Those skilled in the art will understand that various alterations and amendments could be made to the embodiments disclosed above without deviating from the substance of the invention. Thus, the scope of protection of the present invention should be defined by the attached claims.

The invention claimed is:

1. An automation terminal for a power distribution network, disposed at a power distribution apparatus and used to monitor at least one incoming line and at least one outgoing line of the power distribution apparatus, the automation terminal comprising:

a fault detection apparatus to, for each respective line amongst the at least one incoming line and the at least one outgoing line, record a number of faults which occur on each respective line;

an automated reclosing detection apparatus, to determine a number of automated reclosing operations executed by a substation side associated with the power distribution apparatus on the basis of at least one of a current a voltage on each respective line; and a fault determination apparatus to determine, for respective each line and within a fault type determination period, that a fault on the respective line is a permanent fault upon a number of faults occurring on the respective line being greater than a maximum number of automated reclosing operations permitted by the substation side, or upon the fault being a further fault;

wherein the fault type determination period is a time period after the $j^{th}$ automated reclosing operation, where j is a natural number, j is greater than or equal to 1, and less than or equal to the maximum number of automated reclosing operations.

2. The automation terminal of claim 1, wherein when the automation terminal includes a fault isolation function, the fault type determination period being a time period after the $j^{th}$ automated reclosing operation, where j is the maximum number of automated reclosing operations.

3. The automation terminal of claim 1, wherein when the automation terminal lacks a fault isolation function, the fault type determination period is a time period after the $j^{th}$ automated reclosing operation, where j is one less than the maximum number of automated reclosing operations.

4. The automation terminal of claim 1, wherein when the maximum number of automated reclosing operations is 1, the fault type determination period is a time period after the jth automated reclosing operation, where j=1.

5. The automation terminal of claim 1, wherein upon the automated reclosing detection apparatus detecting that a respective line has lost power and is then energized, then the automated reclosing detection apparatus determines that an automated reclosing operation has been executed.

6. The automation terminal of claim 1, wherein the automation terminal is a power distribution terminal or a feeder terminal.

7. A fault type determination method for an automation terminal in a power distribution network, wherein the automation terminal is configured to monitor at least one incoming line and at least one outgoing line at a power distribution apparatus, the method comprising:
recording, for each respective line amongst the at least one incoming line and the at least one outgoing line, a number of faults which occur on the respective line;
determining, based upon at least one of a current and a voltage on each respective line, a number of automated reclosing operations executed on the respective line; and
determining, for each respective line and within a fault type determination period, that a fault on the respective line is a permanent fault upon a number of faults occurring on the respective line being greater than a maximum permitted number of automated reclosing operations, or upon a further fault occurring on the respective line;
wherein the fault type determination period is a time period after the $j^{th}$ automated reclosing operation, where j is a natural number, j is greater than or equal to 1, and less than or equal to the maximum number of automated reclosing operations.

8. The method of claim 7, wherein when the automation terminal includes a fault isolation function, the fault type determination period being a time period after the $j^{th}$ automated reclosing operation, where j is the maximum number of automated reclosing operations.

9. The method of claim 7, wherein when the automation terminal lacks a fault isolation function, the fault type determination period is a time period after the $j^{th}$ automated reclosing operation, where j is one less than the maximum number of automated reclosing operations.

10. The method of claim 7, wherein when the maximum number of automated reclosing operations is 1, the fault type determination period is a time period after the $j^{th}$ automated reclosing operation, where j=1.

11. The method of claim 7, wherein upon detecting that a line has lost power and then been energized, determining that an automated reclosing operation has been executed.

12. A power distribution system, comprising:
a substation, to deliver electrical energy to a line at a power distribution voltage;
a power distribution apparatus, to distribute electrical energy from the substation, the power distribution apparatus including at least one incoming line and at least one outgoing line; and
the automation terminal of claim 1, to detect a condition of each respective line amongst the at least one incoming line and at least one outgoing line, and to determine whether a fault which occurs on a respective line is a permanent fault on the basis of a maximum number of automated reclosing operations at the substation.

13. An automation terminal, disposed at a power distribution apparatus, to monitor at least one incoming line and at least one outgoing line of the power distribution apparatus, the automation terminal comprising:
a memory, storing a machine-executable code which, when executed by a processor, is configured to execute the method of claim 7; and
a processor coupled to the memory, to execute the machine-executable code stored on the memory.

14. A non-transitory machine-readable medium, on which are stored executable commands which, when executed, cause a machine to execute the method of claim 7.

15. A power distribution system, comprising:
a substation, to deliver electrical energy to a line at a power distribution voltage;
a power distribution apparatus, to distribute electrical energy from the substation, the power distribution apparatus including at least one incoming line and at least one outgoing line; and
the automation terminal of claim 2, to detect a condition of each respective line amongst the at least one incoming line and at least one outgoing line, and to determine whether a fault which occurs on a respective line is a permanent fault on the basis of a maximum number of automated reclosing operations at the substation.

16. A power distribution system, comprising:
a substation, to deliver electrical energy to a line at a power distribution voltage;
a power distribution apparatus, to distribute electrical energy from the substation, the power distribution apparatus including at least one incoming line and at least one outgoing line; and
the automation terminal of claim 3, to detect a condition of each respective line amongst the at least one incoming line and at least one outgoing line, and to determine whether a fault which occurs on a respective line is a permanent fault on the basis of a maximum number of automated reclosing operations at the substation.

17. An automation terminal, disposed at a power distribution apparatus, to monitor at least one incoming line and at least one outgoing line of the power distribution apparatus, the automation terminal comprising:
a memory, storing a machine-executable code which, when executed by a processor, is configured to execute the method of claim 8; and
a processor coupled to the memory, to execute the machine-executable code stored on the memory.

18. A non-transitory machine-readable medium, on which are stored executable commands which, when executed, cause a machine to execute the method of claim 8.

19. The automation terminal of claim 1, wherein the automation terminal determines, based on the number of automated reclosing operations already executed as detected on the power distribution side, as well as the number of faults on each line, whether the line fault currently detected is a permanent fault, within a predetermined fault type determination period.

* * * * *